United States Patent
Huang

(10) Patent No.: US 10,324,192 B2
(45) Date of Patent: Jun. 18, 2019

(54) SWITCHING METHOD AND SWITCHING APPARATUS

(71) Applicant: Beijing Zhigu Rui Tuo Tech Co., Ltd., Beijing (CN)

(72) Inventor: Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/251,043

(22) Filed: Aug. 30, 2016

(65) Prior Publication Data

US 2017/0086120 A1 Mar. 23, 2017

(30) Foreign Application Priority Data

Sep. 22, 2015 (CN) .......................... 2015 1 0608514

(51) Int. Cl.
*H04W 36/00* (2009.01)
*G01S 19/13* (2010.01)
(Continued)

(52) U.S. Cl.
CPC .............. *G01S 19/13* (2013.01); *H04W 4/02* (2013.01); *H04W 4/026* (2013.01); *H04W 4/027* (2013.01);
(Continued)

(58) Field of Classification Search
CPC ... G01S 19/13; H04W 36/0022; H04W 24/10; H04W 4/028; H04W 4/026; H04W 36/32;
(Continued)

(56) References Cited

U.S. PATENT DOCUMENTS 9,144,005 B2 * 9/2015 Lee .......................... H04M 3/58
2006/0083199 A1 * 4/2006 Yang .................. H04L 29/06027
370/331
(Continued)

FOREIGN PATENT DOCUMENTS

| CN | 101340704 A | 1/2009 |
|---|---|---|
| CN | 101668086 A | 3/2010 |
| CN | 102547833 A | 7/2012 |
| CN | 103987097 A | 8/2014 |

*Primary Examiner* — Ajit Patel
(74) *Attorney, Agent, or Firm* — Sheppard Mullin Richter & Hampton LLP

(57) ABSTRACT

Embodiments of the present application disclose a switching method and a switching apparatus. The method comprises: determining voice service quality of at least one position in a movement path of at least one UE; determining a position of the at least one UE; and triggering, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode. In the method and apparatus of the embodiments of the present application, switching is triggered, by determining a movement path and a position of a UE, in advance before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

29 Claims, 6 Drawing Sheets

(51) Int. Cl.
*H04W 4/02* (2018.01)
*H04W 36/32* (2009.01)
*H04W 4/029* (2018.01)
*H04W 36/30* (2009.01)

(52) U.S. Cl.
CPC ....... *H04W 4/029* (2018.02); *H04W 36/0022* (2013.01); *H04W 36/32* (2013.01); *H04W 36/30* (2013.01)

(58) Field of Classification Search
CPC ....... H04W 4/02; H04W 4/027; H04W 88/06; H04W 36/30
See application file for complete search history.

(56) References Cited

U.S. PATENT DOCUMENTS

| | | | |
|---|---|---|---|
| 2010/0069021 A1* | 3/2010 | Echensperger | H04W 36/12 455/99 |
| 2011/0151874 A1* | 6/2011 | Olsson | H04W 36/0022 455/436 |
| 2011/0173330 A1* | 7/2011 | Gong | H04W 28/26 709/226 |
| 2015/0350995 A1* | 12/2015 | Dudai | H04W 36/32 370/329 |
| 2016/0345220 A1* | 11/2016 | Brisebois | H04W 36/023 |
| 2016/0353330 A1* | 12/2016 | Naik | H04W 36/0022 |
| 2017/0019819 A1* | 1/2017 | Yang | H04B 7/1855 |
| 2017/0055197 A1* | 2/2017 | Shukair | H04W 36/165 |
| 2017/0105093 A1* | 4/2017 | Qu | H04W 4/021 |

* cited by examiner

SWITCHING METHOD AND SWITCHING APPARATUS

TECHNICAL FIELD

The present application relates to the field of communications technologies, and in particular, to a switching method and a switching apparatus.

BACKGROUND

Although a Long Term Evolution (LTE) network is a fully packet switched network, voice services are indispensible and important services in a long time. To ensure the smooth development of high-quality voice services over the LTE network, various standardization organizations study actively and propose multiple voice service solutions.

One of the solutions to voice services over the LTE network is a circuit switched fallback (CSFB) approach in which a user resides in the LTE network, and a call falls back to a circuit switched (CS) domain when the user initiates or receives a voice service. An advantage of the CSFB is that operators just need to upgrade a mobile switching center (MSC) adjacent to the LTE network coverage instead of deploying an IP multimedia subsystem (IMS) network, and therefore, can provide voice services over the LTE network quickly. A disadvantage of the CSFB is that a call connection is established slowly, and user perceptions are poor. Another solution to the voice services over the LTE network is IMS-based voice, that is, VoLTE. Single radio voice call continuity (SR-VCC) is a VoLTE handover technology widely used by operators, and mainly resolves a problem of how to maintain voice service continuity when a single radio user equipment (UE) moves between the LTE network and a 2G/3G network, that is, a seamless handover when the single radio UE switches between an IMS-controlled Voice over Internet Protocol (VoIP) voice service (VoIP voice service) and a non-IMS controlled voice service (e.g. a CS domain voice service) or is handed over from the LTE network to the 2G/3G network. As compared with other handover technologies, the SR-VCC is more mature, and is used by most mainstream operators.

As shown in FIG. 1, the SR-VCC handover is triggered by a change of network quality/network coverage measured by a UE. In a VoLTE process, a UE keeps sending a measurement report to an evolved UMTS Terrestrial Radio Access Network (E-UTRAN), and the E-UTRAN determines, according to the measurement report, whether the UE needs to be handed over to the 2G/3G network.

However, as compared with the 2G/3G network, there are more coverage holes in the LTE network, and channel quality may suddenly change, for example, in an area such as an elevator, a subway, and an interior of a building. In the traditional SR-VCC handover, a handover decision is performed after a radio channel measurement report is obtained. At this time, the quality of a voice service may have been very poor, or a voice service has even been interrupted. Or, a normal SR-VCC process may not be completed in a short time. For a real-time data service such as the VoLTE, the relatively poor service quality or even interrupted service substantially affects user experiences.

SUMMARY

In view of this, one objective of the embodiments of the present application is to provide a new voice service switching approach.

To achieve the foregoing objective, according to a first aspect of the embodiments of the present application, a switching method is provided. The method comprises: determining voice service quality of at least one position in a movement path of at least one UE;

determining a position of the at least one UE; and triggering, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

According to a second aspect of the embodiments of the present application, a switching method is provided. The method comprises:

sending information associated with a position of a UE; and implementing switching of the UE from a first voice communication mode to a second voice communication mode in response to reception of a control command from at least one application server, wherein the control command is sent by the at least one application server in response to that voice service quality of at least one position in a movement path of the UE meets a preset condition and the UE fails to arrive at the at least one position corresponding to the voice service quality that meets the preset condition.

According to a third aspect of the present application, a switching apparatus is provided. The apparatus comprises:

a first determining module, configured to determine voice service quality of at least one position in a movement path of at least one UE;

a second determining module, configured to determine a position of the at least one UE; and a triggering module, configured to trigger, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

According to a fourth aspect of the present application, a switching apparatus is provided. The apparatus comprises:

a second sending module, configured to send information associated with a position of a UE; and a switching module, configured to implement the switching of the UE from a first voice communication mode to a second voice communication mode in response to reception of a control command from at least one application server, wherein the control command is sent by the at least one application server in response to that voice service quality of at least one position in a movement path of the UE meets a preset condition and the UE fails to arrive at the at least one position corresponding to the voice service quality that meets the preset condition.

According to a fifth aspect of the present application, a switching apparatus is provided. The apparatus comprises:

a transceiver;

a memory, configured to store an instruction; and a processor, configured to execute the instruction stored in the memory, wherein the instruction enables the processor to execute the following steps:

determining voice service quality of at least one position in a movement path of at least one UE;

determining a position of the at least one UE; and triggering, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

According to a sixth aspect of the present application, a switching apparatus is provided. The apparatus comprises:
a transceiver;
a memory, configured to store an instruction; and
a processor, configured to execute the instruction stored in the memory, wherein the instruction enables the processor to execute the following steps:
sending, by using the transceiver, information associated with a position of a UE; and
implementing switching of the UE from a first voice communication mode to a second voice communication mode in response to reception of a control command from at least one application server, wherein
the control command is sent by the at least one application server in response to that voice service quality of at least one position in a movement path of the UE meets a preset condition and the UE fails to arrive at the at least one position corresponding to the voice service quality that meets the preset condition.

In the method and apparatus of the embodiments of the present application, switching is triggered, by determining a movement path and a position of a UE, in advance before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

DETAILED DESCRIPTION

Specific implementation manners of the present invention are further described in detail below with reference to the accompanying drawings and embodiments. The following embodiments are intended to describe the present invention, but not to limit the scope of the present invention.

A person skilled in the art can understand that terms such as "first" and "second" in the present application are merely intended to differentiate between different devices, modules, parameters, or the like, and the terms neither represent any specific technical meanings, nor indicate a necessary logical order therebetween.

Figure 2:
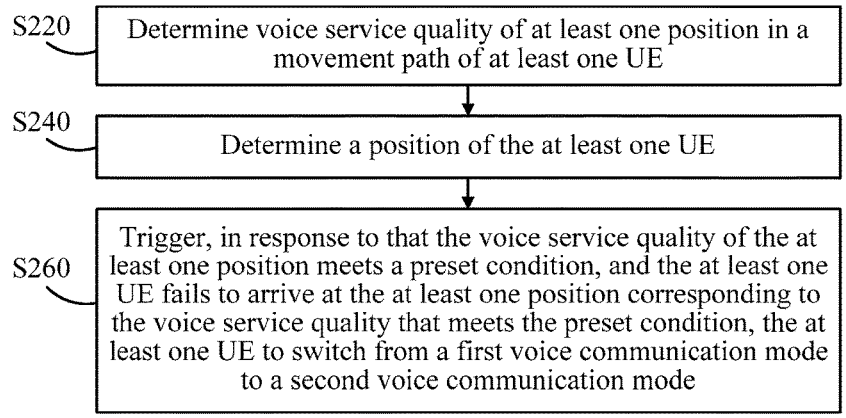
FIG. 2 is a flowchart of an example of a switching method according to a first embodiment of the present application.

In the embodiments of the present application, the term "switch" means switching a voice service from a current domain (e.g. IMS) to a more appropriate domain (e.g. CS). The first voice communication mode means IMS based voice communication, and the second voice communication mode means CS domain voice communication. It should be understood that the IMS is defined mainly for a GSM network by a 3GPP standardization organization, but another organization 3GPP2 defines a similar system called a multimedia domain (MMD). The MMD is essentially used in the IMS of CDMA. Because the MMD is essentially equivalent to the IMS, the term "IMS" used in the present specification is used to represent the IMS and the MMD. UE comprises personal computers (desktop computer, portable computer, palmtop computer, and the like) and mobile devices (mobile phone, wearable device, on-board equipment, and the like) that can perform radio communication, and the UE can operate in multiple modes. The UE can perform CS domain communication as well as packet switched (PS) domain communication, and can transfer from one communication mode to another communication mode without a loss of continuity. FIG. 2 is a flowchart of a switching method according to a first embodiment of the present application. As shown in FIG. 2, the method comprises: S220: Determine voice service quality of at least one position in a movement path of at least one UE.

The movement path is a current movement path or an expected movement path of the corresponding UE. Step S220 may be performed before the UE starts to move in the movement path, or may be performed in a process when the UE moves in the movement path. The voice service quality of at least one position in the movement path is used to evaluate quality of voice service/services that can be provided by network coverage state/states of one or more positions in the movement path, and may comprise voice service quality of one position or voice service quality of a particular geographic range at which multiple positions are located. The voice service quality is related to a geographic position. An evaluation indicator comprises, but is not limited to, at least one of the following: a call completion rate of a position, a call drop rate of a position, perceptual evaluation of speech quality (PESQ) of a position, frequency/the number of times of switching of a voice communication mode in a range at which multiple positions in a movement path are located, and the like. In addition, the foregoing evaluation indicators may be used in combination.

S240: Determine a position of the at least one UE.

S260: Trigger, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

Figure 1:
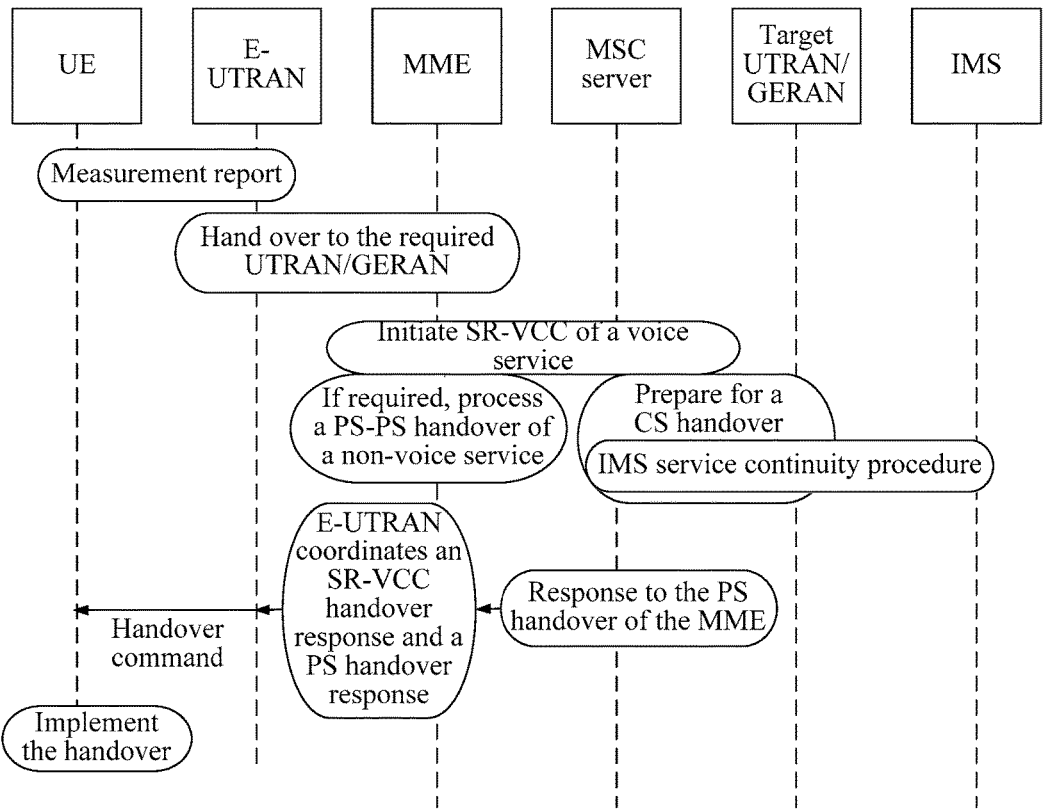
FIG. 1 is a schematic diagram of a standard SR-VCC handover process.

In the method of this embodiment, the preset condition is a condition that needs to be met for initiating switching from the first voice communication mode to the second voice communication mode. According to a standard switching process shown in FIG. 1, when a UE arrives at a position or a position range that meets a preset condition, a switching process of switching from a first voice communication mode to a second voice communication mode is triggered, a measurement report sent by the UE to an access network side comprises a current channel quality measurement result that meets a switching condition, and then the switching is triggered. On the basis of different evaluation indicators of voice service quality, the preset condition may be: a call completion rate of voice calls of a position in the movement path is less than a first threshold; a call drop rate of voice calls of a position is greater than a second threshold; PESQ of a position is less than a third threshold; frequency/the number of times of switching of a voice communication mode in a geographic position range is greater than a fourth threshold; and the like. The foregoing preset condition, the first threshold, the second threshold, the third threshold, the fourth threshold, and the like can be set according to communication requirements.

In the method of this embodiment, switching is triggered, by determining a movement path and a position of a UE, in advance before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

It should be noted that, in the method of this embodiment, the failing to arrive at the at least one position corresponding to the voice service quality that meets the preset condition means arriving at: any possible position before the at least one position in a process that the UE advances in the movement path, so as to achieve the objective of triggering the switching in advance of the method of this embodiment. To avoid affecting other communication services of the UE, in the method of this embodiment, a position for triggering the switching is preferably selected to cause: when the UE moves to the at least one position corresponding to the voice service quality that meets the preset condition, the switching of the voice communication mode is completed, or the switching is not completed but a time needed for completing the switching of the voice communication mode would not cause an interruption of a current voice service or would not reduce communication quality to an extent of affecting user experiences. Optionally, using a voice service continuity requirement of a switching interruption being less than 300 ms that meets the standard as an example, the position of the UE for triggering the switching of the voice communication mode shall meet a condition: a time for the UE to move to the nearest position whose voice service quality meets the preset condition is less than 300 ms.

In a possible implementation manner, step S220 may further comprise:

S222: Determine the movement path of the at least one UE at least according to information associated with the movement path of the at least one UE.

The information associated with the movement path of the at least one UE may be known to an apparatus that implements the method of this embodiment, or may be acquired by communicating with the at least one UE or another device knowing the information. Further, the information associated with the movement path of the at least one UE comprises any information that can be used to determine the movement path, for example, but not limited to, historical movement information of the UE, an expected movement path of the UE, an origin and a destination of the UE, and the like. Further, the historical movement information of the UE may comprise a part of the path for which the UE has advanced in the current movement path, and a movement trend of the UE can be predicted according to this part of information; and the historical movement information may further comprise information associated with a travel rule of the UE, and a travel habit of the UE at a same period of time can be predicted according to the information, for example, a path to work at a time to go to work is relatively regular, and the like.

S224: Determine the voice service quality at least according to at least one voice service quality indicator of the at least one position in the movement path. The at least one voice service quality indicator may be historical statistics that can be acquired, or may be determined by means of measurement in real-time or measurement in response to the execution of the method of this embodiment. For example, an apparatus for implementing the method of this embodiment may be an application server independent from a UE and any access network side device (e.g. base station), and may establish a relationship between voice service quality and geographic position by learning: pre-establishing a network coverage distribution map in which particular positions with relatively good VoLTE communication quality are marked, particular positions with poor VoLTE communication quality are marked, and particular LTE coverage holes are marked, and the foregoing information may be determined by collecting historical communication quality of VoLTE calls performed in these positions. In a possible implementation manner, step S240 may further comprise:

S242: Acquire information associated with the position of the at least one UE.

S244: Determine the position at least according to the information associated with the position of the at least one UE.

The method of this embodiment may be implemented by an apparatus independent from a UE and any network device at an access network side of the UE, for example, at least one application server. In this case, in step S242, the information associated with the position of the at least one UE may be acquired by using an application on the at least one UE. In addition, the information associated with the position of the at least one UE comprises at least one of the following: Global Positioning System (GPS) information, information sensed by at least one motion sensor, information sensed by at least one magnetic field sensor, and any other information that can be used to determine the position of the UE. The information may be acquired by using sensors on the UE, such as a gyroscope and an accelerometer.

In an implementation manner that an application server implements the method of this embodiment, by means of an application program, a position of a UE is determined and a possible switching of a voice communication mode is triggered. Therefore, it would be easier to accurately determine that the UE approaches a position whose radio channel condition changes suddenly (e.g. elevator, subway, and the like), and a process of triggering the switching is relatively simple. Specifically:

In a possible implementation manner, step S260 may further comprise:

S262: Trigger the at least one UE to send, before arriving at the position corresponding to the voice service quality that meets the preset condition, a measurement report to an access network side of the at least one UE. The measurement report is used to indicate that current voice service quality of the at least one UE meets a condition for switching from the first voice communication mode to the second voice communication mode.

In the method of this embodiment, the switching of the voice communication mode is triggered in a manner of triggering modification of the measurement report that is sent by the UE to the access network side. That is, the channel quality of the current position at which the UE is located fails to meet the condition for switching the voice communication mode, however, by means of the method of this embodiment, content of the measurement report is modified to be poorer than the current actual network quality and is modified to meet the condition for switching the voice communication mode, and therefore, the triggering of a process of switching the voice communication mode is performed in advance. Description is made with reference to FIG. 1. In a standard SR-VCC process, a network side device receives a channel quality measurement report related to a WCDMA/TD-SCDMA/GSM signal and an LTE signal that is sent by a UE. If quality of the current LTE signal is less than a threshold, and quality of a 2G/3G signal is greater than a threshold, an SR-VCC handover process is initiated, to cause the UE to be handed over from VoLTE to 2G/3G voice. By means of the method of this embodiment, if it is determined that a UE is to enter a VoLTE area with relatively small coverage or a non-VoLTE coverage area, an adjusted measurement report is to be sent even if LTE radio signal quality of a current position of the UE is good, so as to enable reported LTE network quality to be poorer than actual measured LTE network quality, thereby initiating the SR-VCC handover process.

In a possible implementation manner, step S260 may further comprise:

S264: Establish a voice communication link of the second voice communication mode for the at least one UE.

S266: Disconnect a voice communication link of the first voice communication mode of the at least one UE in response to the establishment of the voice communication link of the second voice communication mode.

That is, a communication link of the second voice communication mode is further established on the basis of retaining a voice communication link of the current first voice communication mode of the UE, and the link of the first voice communication mode is disconnected after the communication link of the second voice communication mode is established. For the network side device, it is equivalent to that the UE makes another voice call, and drops an original voice call. Alternatively, the UE has multiple transceivers and can simultaneously maintain two voice communication links. In this case, a new voice link may be established first, and then an original voice link is disconnected.

To sum up, in the method of this embodiment, the switching of a voice communication mode does not involve a network side device and does not need to change the standard, and can be easily deployed.

Besides, to implement the method of this embodiment, the method of this embodiment further comprises:

S280: Send a control command associated with the triggering to the at least one UE in a manner that the at least one UE can accept the control command.

Figure 3:
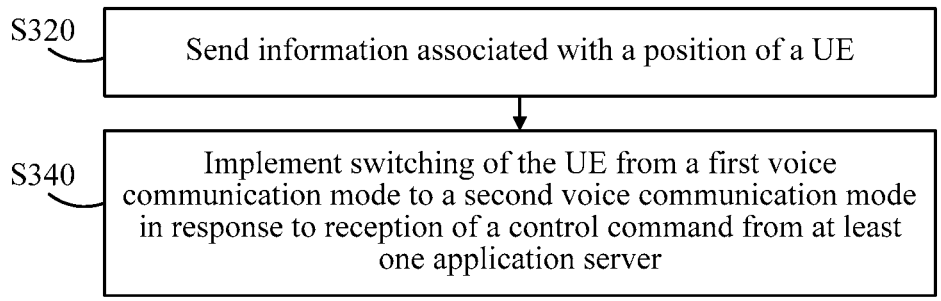
FIG. 3 is a flowchart of an example of a switching method according to a second embodiment of the present application.

The present application further provides a switching method of a second embodiment, and the switching method is performed by a UE side. As shown in FIG. 3, the method comprises:

S320: Send information associated with a position of a UE.

As described in the description that is made with reference to FIG. 2, the information associated with the position of the UE comprises at least one of the following: GPS information, information sensed by at least one motion sensor, information sensed by at least one magnetic field sensor, and any other information that can be used to determine the position of the UE. The information may be acquired by using sensors on the UE, such as a gyroscope and an accelerometer.

S340: Implement switching of the UE from a first voice communication mode to a second voice communication mode in response to reception of a control command from at least one application server.

Still as described in the description that is made with reference to FIG. 2, the control command is sent by the at least one application server in response to that voice service quality of at least one position in a movement path of the UE meets a preset condition and the UE fails to arrive at the at least one position corresponding to the voice service quality that meets the preset condition. The preset condition is a condition that needs to be met for initiating switching from the first voice communication mode to the second voice communication mode. According to a standard switching process shown in FIG. 1, when a UE arrives at a position or a position range that meets a preset condition, a switching process of switching from a first voice communication mode to a second voice communication mode is triggered, and the switching is implemented by enabling a measurement report sent by the UE to an access network side to comprise a current channel quality measurement result that meets a switching condition. On the basis of different evaluation indicators of voice service quality, the preset condition may be: a call completion rate of voice calls of a position in the movement path is less than a first threshold; a call drop rate of voice calls of a position is greater than a second threshold; PESQ of a position is less than a third threshold; frequency/the number of times of switching of a voice communication mode in a geographic position range is greater than a fourth threshold; and the like. The foregoing preset condition, the first threshold, the second threshold, the third threshold, the fourth threshold, and the like can be set according to communication requirements.

In the method of this embodiment, switching of a voice communication mode is implemented, by reporting a position of a UE, before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

It should be noted that, in the method of this embodiment, the failing to arrive at the at least one position corresponding to the voice service quality that meets the preset condition means arriving at: any possible position before the at least one position in a process that the UE advances in the movement path, so as to achieve the objective of implementing the switching in advance of the method of this embodiment. To avoid affecting other communication services of the UE, in the method of this embodiment, a position for implementing the switching is preferably selected to cause: when the UE moves to the at least one position corresponding to the voice service quality that meets the preset condition, the switching of the voice communication mode is completed, or the switching is not completed but a time needed for completing the switching of the voice communication mode would not cause an interruption of a current voice service or would not reduce communication quality to an extent of affecting user experiences. Optionally, using a voice service continuity requirement of a switching interruption being less than 300 ms that meets the standard as an example, the position of the UE for implementing the switching of the voice communication mode shall meet a condition: a time for the UE to move to the nearest position whose voice service quality meets the preset condition is less than 300 ms.

In a possible implementation manner, in step S320, the associated information is sent by using at least one application on the UE corresponding to the at least one application server. Therefore, the application server can determine, by using an application layer program, the position of the UE, and trigger a possible switching of a voice communication mode. Therefore, it would be easier to accurately determine that the UE approaches a position whose radio channel condition changes suddenly (e.g. elevator, subway, and the like), and a process of triggering the switching is relatively simple.

Besides, still as described in the description that is made with reference to FIG. 2, a movement path of the UE is determined at least according to information associated with the movement path of the UE. In this implementation manner, the method of this embodiment further comprises:

S330: Send the information associated with the movement path of the UE.

The information associated with the movement path of the UE may be known to an apparatus that implements the method of this embodiment, or may be acquired by communicating with the UE or another device knowing the information. Further, the information associated with the movement path of the UE comprises any information that can be used to determine the movement path, for example, but not limited to, historical movement information of the UE, an expected movement path of the UE, an origin and a destination of the UE, and the like. Further, the historical movement information of the UE may comprise a part of the path for which the UE has advanced in the current movement path, and a movement trend of the UE can be predicted according to this part of information; and the historical movement information may further comprise information associated with a travel rule of the UE, and a travel habit of the UE at a same period of time can be predicted according to the information, for example, a path to work at a time to go to work is relatively regular, and the like.

Besides, in the method of this embodiment, the switching of the communication mode can be implemented in different manners. In a possible implementation manner, step S340 comprises:

S342: Send a measurement report to an access network side of the UE before the UE arrives at the at least one position corresponding to the voice service quality that meets the preset condition. The measurement report is used to indicate that current voice service quality of the UE meets a condition for switching from the first voice communication mode to the second voice communication mode.

In the method of this embodiment, the switching of the voice communication mode is implemented in a manner of modifying the measurement report that is sent by the UE to the access network side. That is, the channel quality of the current position at which the UE is located fails to meet the condition for switching the voice communication mode, however, by means of the method of this embodiment, content of the measurement report is modified to be poorer than the current actual network quality and is modified to meet the condition for switching of the voice communication mode, and therefore, implementation of a process of switching the voice communication mode is performed in advance. Description is made with reference to FIG. 1. In a standard SR-VCC process, a network side device receives a channel quality measurement report related to a WCDMA/TD-SCDMA/GSM signal and an LTE signal that is sent by a UE. If quality of the current LTE signal is less than a threshold, and quality of a 2G/3G signal is greater than a threshold, an SR-VCC handover process is activated, to cause the UE to be handed over from VoLTE to 2G/3G voice. By means of the method of this embodiment, if it is determined that a UE is to enter a VoLTE area with relatively small coverage or a non-VoLTE coverage area, an adjusted measurement report is to be sent even if LTE radio signal quality of a current position of the UE is good, so as to enable reported LTE network quality to be poorer than actual measured LTE network quality, thereby initiating the SR-VCC handover process.

In another possible implementation manner, step S340 may further comprise:

S344: Establish a voice communication link of the second voice communication mode for the UE.

S345: Disconnect a voice communication link of the first voice communication mode of the UE in response to the establishment of the voice communication link of the second voice communication mode.

That is, a communication link of the second voice communication mode is further established on the basis of retaining a voice communication link of the current first voice communication mode of the UE, and the link of the first voice communication mode is disconnected after the communication link of the second voice communication mode is established. For the network side device, it is equivalent to that the UE makes another voice call, and drops an original voice call. Alternatively, the UE has multiple transceivers and can simultaneously maintain two voice communication links. In this case, a new voice link may be established first, and then an original voice link is disconnected.

To sum up, in the method of this embodiment, switching of a voice communication mode does not involve a network side device and does not need to change the standard, and can be easily deployed.

A person skilled in the art can understand that in the foregoing methods of the specific implementation manners of the present application, the value of the serial number of each step described above does not mean an execution sequence, and the execution sequence of each step should be determined according to the function and internal logic thereof, and should not be any limitation on the implementation procedure of the specific implementation manners of the present application.

Besides, the embodiments of the present application further provide a computer readable medium, comprising computer readable instructions for performing the following operations when the operations are executed: operations for performing the steps of the method shown in the implementation manner of FIG. 2.

Besides, the embodiments of the present application further provide a computer readable medium, comprising computer readable instructions for performing the following operations when the operations are executed: operations for performing the steps of the method shown in the implementation manner of FIG. 3.

Figure 4A:
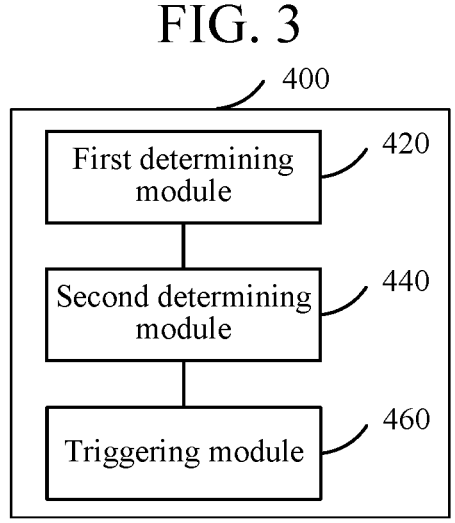
FIG. 4a to FIG. 4f are structural block diagrams of multiple examples of a switching apparatus according to an embodiment of the present application.

FIG. 4a is a structural block diagram of an example of a switching apparatus 400 according to the first embodiment of the present application. As shown in FIG. 4a, the apparatus 400 comprises a first determining module 420, a second determining module 440, and a triggering module 460.

The first determining module 420 is configured to determine voice service quality of at least one position in a movement path of at least one UE.

The movement path is a current movement path or an expected movement path of the corresponding UE. The first determining module 420 may determine a to-be-advanced movement path of the UE before the UE starts to move in the movement path, or determine a remaining movement path of the UE in a process when the UE moves in the movement path. The voice service quality of at least one position in the movement path is used to evaluate quality of voice service/services that can be provided by network coverage state/states of one or more positions in the movement path, and may comprise voice service quality of one position or voice service quality of a particular geographic range at which multiple positions are located. The voice service quality is related to a geographic position. An evaluation indicator comprises, but is not limited to, at least one of the following: a call completion rate of a position, a call drop rate of a position, PESQ of a position, frequency/the number of times of switching of a voice communication mode in a range at which multiple positions in a movement path are located, and the like. In addition, the foregoing evaluation indicators may be used in combination.

The second determining module 440 is configured to determine a position of the at least one UE.

The triggering module 460 is configured to trigger, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

In the apparatus of this embodiment, the preset condition is a condition that needs to be met for initiating switching from the first voice communication mode to the second voice communication mode. According to a standard switching process shown in FIG. 1, when a UE arrives at a position or a position range that meets a preset condition, a switching process of switching from a first voice communication mode to a second voice communication mode is triggered, a measurement report sent by the UE to an access network side comprises a current channel quality measurement result that meets a switching condition, and then the switching is triggered. On the basis of different evaluation indicators of voice service quality, the preset condition may be: a call completion rate of voice calls of a position in the movement path is less than a first threshold; a call drop rate of voice calls of a position is greater than a second threshold; PESQ of a position is less than a third threshold; frequency/the number of times of switching of a voice communication mode in a geographic position range is greater than a fourth threshold; and the like. The foregoing preset condition, the first threshold, the second threshold, the third threshold, the fourth threshold, and the like can be set according to communication requirements.

In the apparatus of this embodiment, switching is triggered, by determining a movement path and a position of a UE, in advance before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

It should be noted that, in the apparatus of this embodiment, the failing to arrive at the at least one position corresponding to the voice service quality that meets the preset condition means arriving at: any possible position before the at least one position in a process that the UE advances in the movement path, so as to achieve the objective of triggering the switching in advance of the apparatus of this embodiment. To avoid affecting other communication services of the UE, in the apparatus of this embodiment, a position for triggering the switching is preferably selected to cause: when the UE moves to the at least one position corresponding to the voice service quality that meets the preset condition, the switching of the voice communication mode is completed, or the switching is not completed but a time needed for completing the switching of the voice communication mode would not cause an interruption of a current voice service or would not reduce communication quality to an extent of affecting user experiences. Optionally, using a voice service continuity requirement of a switching interruption being less than 300 ms that meets the standard as an example, the position of the UE for triggering the switching of the voice communication mode shall meet a condition: a time for the UE to move to the nearest position whose voice service quality meets the preset condition is less than 300 ms.

Figure 4B:
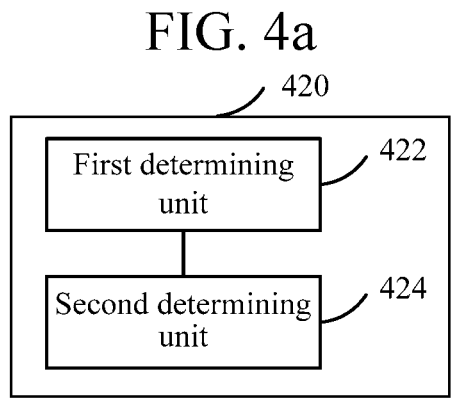

As shown in FIG. 4b, in a possible implementation manner, the first determining module 420 may further comprise a first determining unit 422 and a second determining unit 424.

The first determining unit 422 is configured to determine the movement path of the at least one UE at least according to information associated with the movement path of the at least one UE.

The information associated with the movement path of the at least one UE may be known to the apparatus of this embodiment, or may be acquired by communicating with the at least one UE or another device knowing the information. Further, the information associated with the movement path of the at least one UE comprises any information that can be used to determine the movement path, for example, but not limited to, historical movement information of the UE, an expected movement path of the UE, an origin and a destination of the UE, and the like. Further, the historical movement information of the UE may comprise a part of the path for which the UE has advanced in the current movement path, and a movement trend of the UE can be predicted according to this part of information; and the historical movement information may further comprise information associated with a travel rule of the UE, and a travel habit of the UE at a same period of time can be predicted according to the information, for example, a path to work at a time to go to work is relatively regular, and the like.

The second determining unit 424 is configured to determine the voice service quality at least according to at least one voice service quality indicator of the at least one position in the movement path. The at least one voice service quality indicator may be historical statistics that can be acquired, or may be determined by means of measurement performed by the apparatus of this embodiment. For example, the apparatus of this embodiment may be an application server independent from a UE and any access network side device (e.g. base station), and may establish a relationship between voice service quality and geographic position by learning: pre-establishing a network coverage distribution map in which particular positions with relatively good VoLTE communication quality are marked, particular positions with poor VoLTE communication quality are marked, and particular LTE coverage holes are marked, and the foregoing information may be determined by collecting historical communication quality of VoLTE calls performed in these positions.

Figure 4C:
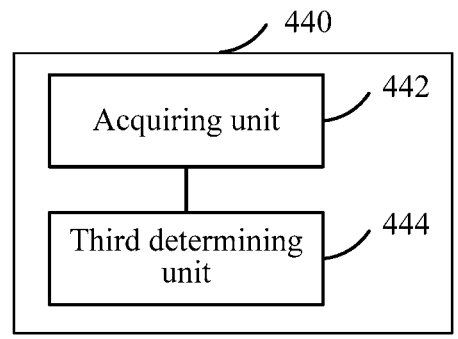

As shown in FIG. 4c, in a possible implementation manner, the second determining module 440 may further comprise:

an acquiring unit 442, configured to acquire information associated with the position of the at least one UE; and a third determining unit 444, configured to determine the position at least according to the information associated with the position of the at least one UE.

The apparatus of this embodiment may be an apparatus independent from a UE and any network device at an access network side of the UE, for example, at least one application server. In this case, the acquiring unit 442 may acquire the information associated with the position of the at least one UE by using an application on the at least one UE. In addition, the information associated with the position of the at least one UE comprises at least one of the following: GPS information, information sensed by at least one motion sensor, information sensed by at least one magnetic field sensor, and any other information that can be used to determine the position of the UE. The information may be acquired by using sensors such as a gyroscope and an accelerometer.

Figure 4D:
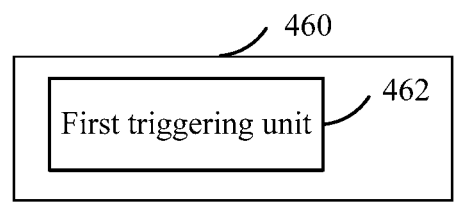

In an implementation manner that the apparatus of this embodiment is or belongs to an application server, by means of an application layer program, a position of a UE is determined and possible switching of a voice communication mode is performed. Therefore, it would be easier to accurately determine that the UE approaches a position whose radio channel condition changes suddenly (e.g. elevator, subway, and the like), and a process of triggering the switching is relatively simple. Specifically:

As shown in FIG. 4d, in a possible implementation manner, the triggering module 460 may further comprise:

a first triggering module 462, configured to trigger the at least one UE to send, before arriving at the position corresponding to the voice service quality that meets the preset condition, a measurement report to an access network side of the at least one UE. The measurement report is used to indicate that current voice service quality of the at least one UE meets a condition for switching from the first voice communication mode to the second voice communication mode.

In the apparatus of this embodiment, the switching of the voice communication mode is triggered in a manner of triggering modification of the measurement report that is sent by the UE to the access network side. That is, the channel quality of the current position at which the UE is located fails to meet the condition for switching the voice communication mode, however, by means of the apparatus of this embodiment, content of the measurement report is modified to be poorer than the current actual network quality and is modified to meet the condition for switching of the voice communication mode, and therefore, a process of switching the voice communication mode is performed in advance. Description is made with reference to FIG. 1. In a standard SR-VCC process, a network side device receives a channel quality measurement report related to a WCDMA/TD-SCDMA/GSM signal and an LTE signal that is sent by a UE. If quality of the current LTE signal is less than a threshold, and quality of a 2G/3G signal is greater than a threshold, an SR-VCC handover process is activated, to cause the UE to be handed over from VoLTE to 2G/3G voice. By means of the method of this embodiment, if it is determined that a UE is to enter a VoLTE area with relatively small coverage or a non-VoLTE coverage area, an adjusted measurement report is to be sent even if LTE radio signal quality of a current position of the UE is good, so as to enable reported LTE network quality to be poorer than actual measured LTE network quality, thereby initiating the SR-VCC handover process.

Figure 4E:
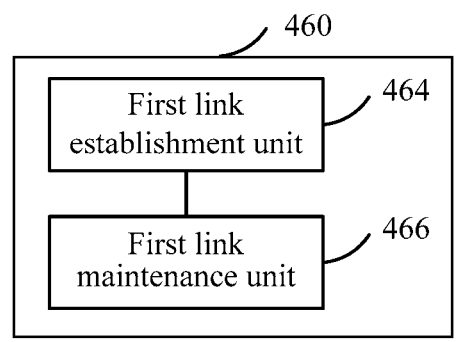

As shown in FIG. 4e, in another possible implementation manner, the triggering module 460 may further comprise:

a first link establishment unit 464, configured to establish a voice communication link of the second voice communication mode for the at least one UE; and a first link maintenance unit 466, configured to disconnect a voice communication link of the first voice communication mode of the at least one UE in response to the establishment of the voice communication link of the second voice communication mode.

That is, a communication link of the second voice communication mode is further established on the basis of retaining a voice communication link of the current first voice communication mode of the UE, and the link of the first voice communication mode is disconnected after the communication link of the second voice communication mode is established. For the network side device, it is equivalent to that the UE makes another voice call, and drops an original voice call. Alternatively, the UE has multiple transceivers and can simultaneously maintain two voice communication links. In this case, a new voice link may be established first, and then an original voice link is disconnected.

To sum up, in the apparatus of this embodiment, switching of a voice communication mode does not involve a network side device and does not need to change the standard, and can be easily deployed.

Figure 4F:
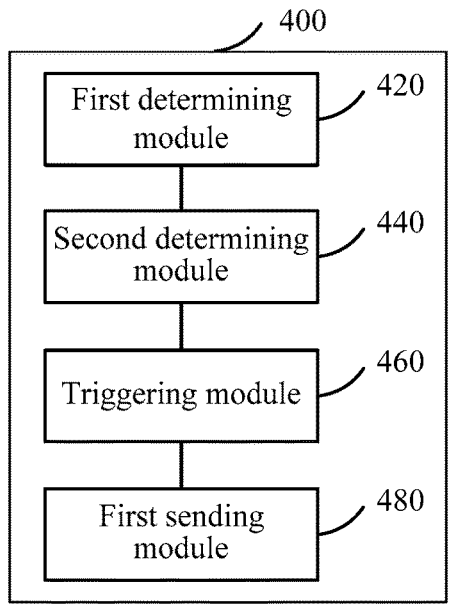

Besides, as shown in FIG. 4f, the apparatus of this embodiment further comprises:

a first sending module 480, configured to send a control command associated with the triggering to the at least one UE in a manner that the at least one UE can accept the control command.

Figure 5A:
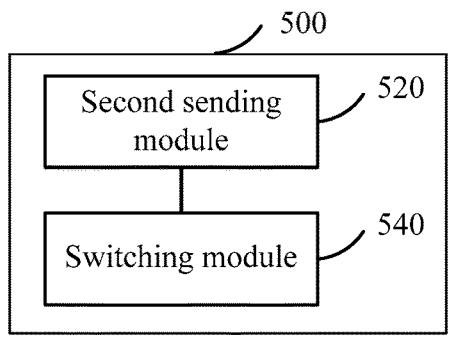
FIG. 5a to FIG. 5d are structural block diagrams of multiple examples of a switching apparatus according to an embodiment of the present application.

The present application further provides a switching apparatus of the second embodiment, and the switching apparatus is a UE or belongs to any UE. As shown in FIG. 5a, the apparatus 500 comprises a second sending module 520 and a switching module 540.

The second sending module 520 is configured to send information associated with a position of a UE.

As described in the description that is made with reference to FIG. 2, the information associated with the position of the UE comprises at least one of the following: GPS information, information sensed by at least one motion sensor, information sensed by at least one magnetic field sensor, and any other information that can be used to determine the position of the UE. The information may be acquired by using sensors on the UE, such as a gyroscope and an accelerometer.

The switching module 540 is configured to implement the switching of the UE from a first voice communication mode to a second voice communication mode in response to reception of a control command from at least one application server.

Still as described in the description that is made with reference to FIG. 2, the control command is sent by the at least one application server in response to that voice service quality of at least one position in a movement path of the UE meets a preset condition and the UE fails to arrive at the at least one position corresponding to the voice service quality that meets the preset condition. The preset condition is a condition that needs to be met for initiating switching from the first voice communication mode to the second voice communication mode. According to a standard switching process shown in FIG. 1, when a UE arrives at a position or a position range that meets a preset condition, a switching process of switching from a first voice communication mode to a second voice communication mode is triggered, and the switching is implemented by enabling a measurement report sent by the UE to an access network side to comprise a current channel quality measurement result that meets a switching condition. On the basis of different evaluation indicators of voice service quality, the preset condition may be: a call completion rate of voice calls of a position in the movement path is less than a first threshold; a call drop rate of voice calls of a position is greater than a second threshold; PESQ of a position is less than a third threshold; frequency/the number of times of switching of a voice communication mode in a geographic position range is greater than a fourth threshold; and the like. The foregoing preset condition, the first threshold, the second threshold, the third threshold, the fourth threshold, and the like can be set according to communication requirements.

In the apparatus of this embodiment of the present application, switching of a voice communication mode is implemented, by reporting a position of a UE, before the UE arrives at a position/position range at which the switching of a voice communication mode should be performed, so as to avoid relatively poor communication quality or even an interrupted communication service caused by a state that a normal switching process cannot be completed in a short time, thereby improving user experiences.

It should be noted that, in the apparatus of this embodiment, the failing to arrive at the at least one position corresponding to the voice service quality that meets the preset condition means arriving at: any possible position before the at least one position in a process that the UE advances in the movement path, so as to achieve the objective of implementing the switching in advance of the apparatus of this embodiment. To avoid affecting other communication services of the UE, in the apparatus of this embodiment, a position for implementing the switching is preferably selected to cause: when the UE moves to the at least one position corresponding to the voice service quality that meets the preset condition, the switching of the voice communication mode is completed, or the switching is not completed but a time needed for completing the switching of the voice communication mode would not cause an interruption of a current voice service or would not reduce communication quality to an extent of affecting user experiences. Optionally, using a voice service continuity requirement of a switching interruption being less than 300 ms that meets the standard as an example, the position of the UE for implementing the switching of the voice communication mode shall meet a condition: a time for the UE to move to the nearest position whose voice service quality meets the preset condition is less than 300 ms.

In a possible implementation manner, the second sending module 520 sends the associated information by using at least one application on the UE corresponding to the at least one application server. Therefore, the application server can determine, by using an application layer program, the position of the UE, and trigger possible switching of the voice communication mode. Therefore, it would be easier to accurately determine that the UE approaches a position whose radio channel condition changes suddenly (e.g. elevator, subway, and the like), and a process of triggering the switching is relatively simple.

Figure 5B:
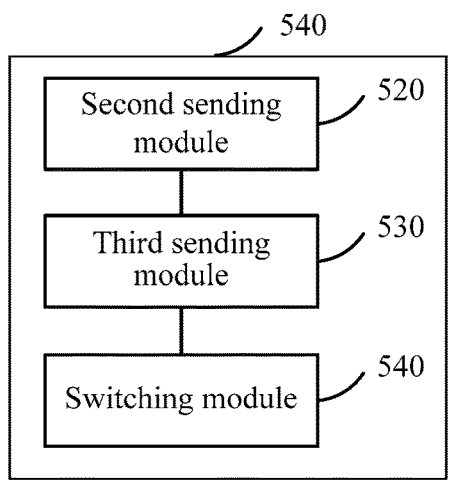

Besides, still as described in the description that is made with reference to FIG. 2, a movement path of the UE is determined at least according to information associated with the movement path of the UE. In this implementation manner, as shown in FIG. 5b, the apparatus 500 of this embodiment further comprises:

a third sending module 530, configured to send the information associated with the movement path of the UE.

The information associated with the movement path of the UE may be known to the apparatus of this embodiment, or may be acquired by communicating with the UE or another device knowing the information. Further, the information associated with the movement path of the UE comprises any information that can be used to determine the movement path, for example, but not limited to, historical movement information of the UE, an expected movement path of the UE, an origin and a destination of the UE, and the like. Further, the historical movement information of the UE may comprise a part of the path for which the UE has advanced in the current movement path, and a movement trend of the UE can be predicted according to this part of information; and the historical movement information may further comprise information associated with a travel rule of the UE, and a travel habit of the UE at a same period of time can be predicted according to the information, for example, a path to work at a time to go to work is relatively regular, and the like.

Figure 5C:
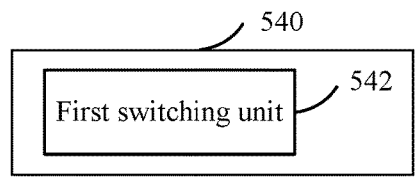

Besides, in the apparatus of this embodiment, the switching of the communication mode can be implemented in different manners. In a possible implementation manner, as shown in FIG. 5c, the switching module 540 may comprise:

a first switching unit 542, configured to send a measurement report to an access network side of the UE before the UE arrives at the at least one position corresponding to the voice service quality that meets the preset condition. The measurement report is used to indicate that current voice service quality of the UE meets a condition for switching from the first voice communication mode to the second voice communication mode.

In the apparatus of this embodiment, the switching of the voice communication mode is implemented in a manner of modifying the measurement report that is sent by the UE to the access network side. That is, the channel quality of the current position at which the UE is located fails to meet the condition for switching the voice communication mode, however, by means of the apparatus of this embodiment, content of the measurement report is modified to be poorer than the current actual network quality and is modified to meet the condition for switching of the voice communication mode, and therefore, implementation of a process of switching the voice communication mode is performed in advance. Description is made with reference to FIG. 1. In a standard SR-VCC process, a network side device receives a channel quality measurement report related to a WCDMA/TD-SCDMA/GSM signal and an LTE signal that is sent by a UE. If quality of the current LTE signal is less than a threshold, and quality of a 2G/3G signal is greater than a threshold, an SR-VCC handover process is activated, to cause the UE to be handed over from VoLTE to 2G/3G voice. By means of the method of this embodiment, if it is determined that a UE is to enter a VoLTE area with relatively small coverage or a non-VoLTE coverage area, an adjusted measurement report is to be sent even if LTE radio signal quality of a current position of the UE is good, so as to enable reported LTE network quality to be poorer than actual measured LTE network quality, thereby initiating the SR-VCC handover process.

Figure 5D:
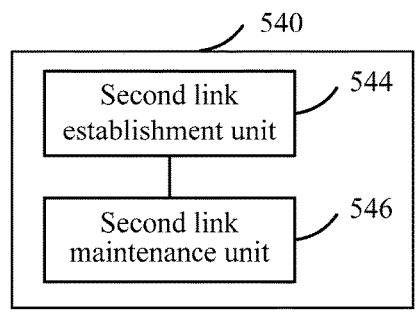

In another possible implementation manner, as shown in FIG. 5d, the switching module 540 may further comprise:

a second link establishment unit 544, configured to establish a voice communication link of the second voice communication mode for the UE; and a second link maintenance unit 546, configured to disconnect a voice communication link of the first voice communication mode of the UE in response to the establishment of the voice communication link of the second voice communication mode.

That is, a communication link of the second voice communication mode is further established on the basis of retaining a voice communication link of the current first voice communication mode of the UE, and the link of the first voice communication mode is disconnected after the communication link of the second voice communication mode is established. For the network side device, it is equivalent to that the UE makes another voice call, and drops an original voice call. Alternatively, the UE has multiple transceivers and can simultaneously maintain two voice communication links. In this case, a new voice link may be established first, and then an original voice link is disconnected.

To sum up, in the apparatus of this embodiment, switching of a voice communication mode does not involve a network side device and does not need to change the standard, and can be easily deployed.

Figure 6:
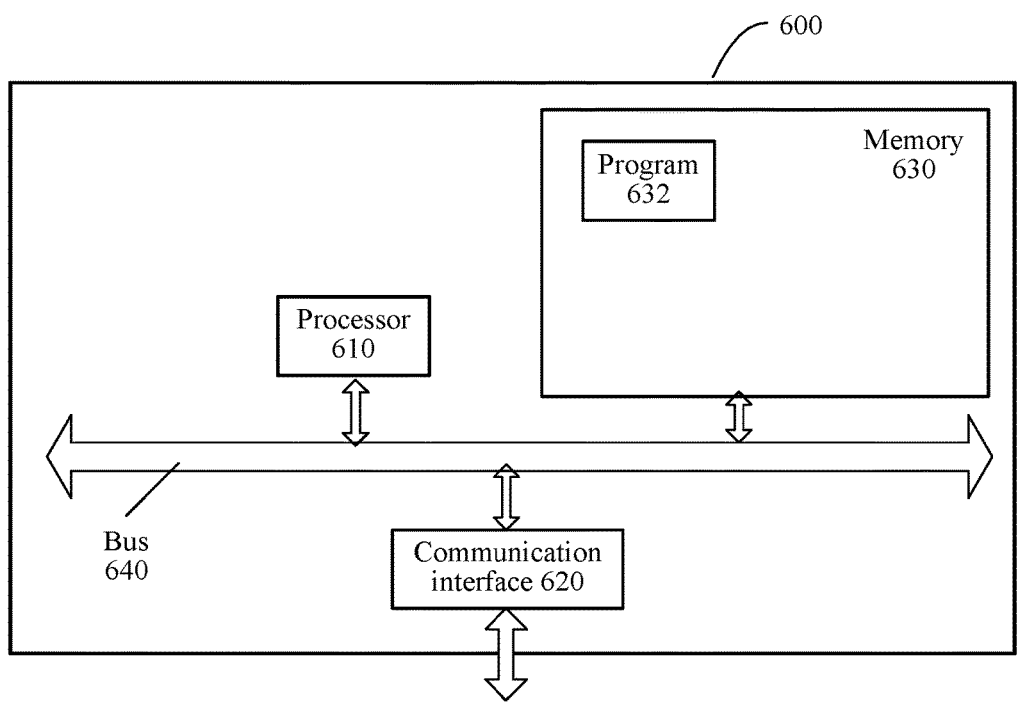
FIG. 6 is a structural block diagram of another example of a switching apparatus according to the first embodiment of the present application.

FIG. 6 is a schematic structural diagram of another example of the switching apparatus according to the first embodiment of the present application. The specific embodiments of the present application do not limit the specific implementation of the switching apparatus. As shown in FIG. 6, the switching apparatus 600 may comprise:

a processor 610, a communication interface 620, a memory 630, and a communications bus 640, wherein The processor 610, the communication interface 620, and the memory 630 communicate with each other by using the communications bus 640.

The communication interface 620 is configured to communicate with a network element such as a client.

The processor 610 is configured to execute a program 632, and specifically, may execute relevant steps in the foregoing method embodiments.

Specifically, the program 632 may comprise a program code, and the program code comprises a computer operation instruction.

The processor 610 may be a central processing unit (CPU), or an application specific integrated circuit (ASIC), or is configured to be one or more integrated circuits for implementing the embodiments of the present application.

The memory 630 is configured to store the program 632. The memory 630 may comprise a high-speed RAM, or may further comprise a non-volatile memory, for example, at least one magnetic disk memory. The program 632 may be specifically configured to enable the switching apparatus 600 to perform the following steps:

determining voice service quality of at least one position in a movement path of at least one UE;

determining a position of the at least one UE; and triggering, in response to that the voice service quality of the at least one position meets a preset condition, and the at least one UE fails to arrive at the at least one position corresponding to the voice service quality that meets the preset condition, the at least one UE to switch from a first voice communication mode to a second voice communication mode.

For specific implementation of the steps in the program 632, refer to the corresponding descriptions in the corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 7:
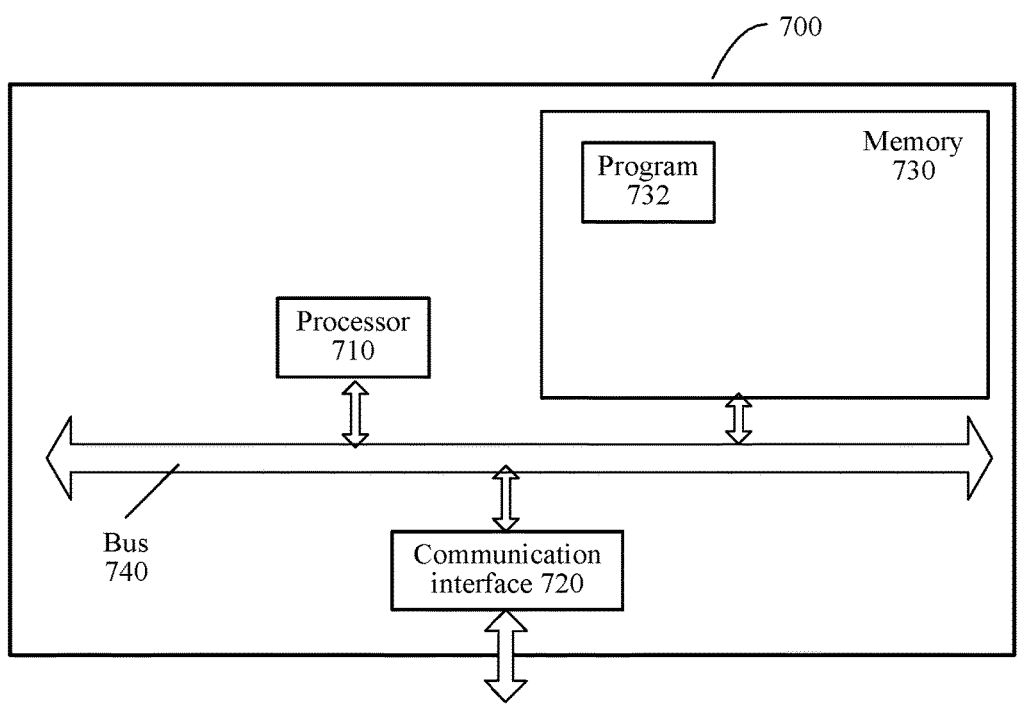
FIG. 7 is a structural block diagram of another example of a switching apparatus according to the second embodiment of the present application.

FIG. 7 is a schematic structural diagram of another example of the switching apparatus according to the second embodiment of the present application. The specific embodiments of the present application do not limit the specific implementation of the switching apparatus. As shown in FIG. 7, the switching apparatus 700 may comprise:

a processor 710, a communication interface 720, a memory 730, and a communications bus 740, wherein The processor 710, the communication interface 720, and the memory 730 communicate with each other by using the communications bus 740.

The communication interface 720 is configured to communicate with a network element such as a client.

The processor 710 is configured to execute a program 732, and specifically, may execute relevant steps in the foregoing method embodiments.

Specifically, the program 732 may comprise a program code, and the program code comprises a computer operation instruction.

The processor 710 may be a central processing unit (CPU), or an application specific integrated circuit (ASIC), or is configured to be one or more integrated circuits for implementing the embodiments of the present application.

The memory 730 is configured to store the program 732. The memory 730 may comprise a high-speed RAM, or may further comprise a non-volatile memory, for example, at least one magnetic disk memory. The program 732 may be specifically configured to enable the switching apparatus 700 to perform the following steps:

sending information associated with a position of a UE; and implementing switching of the UE from a first voice communication mode to a second voice communication mode in response to reception of a control command from at least one application server, wherein the control command is sent by the at least one application server in response to that voice service quality of at least one position in a movement path of the UE meets a preset condition and the UE fails to arrive at the at least one position corresponding to the voice service quality that meets the preset condition.

For specific implementation of the steps in the program 732, refer to the corresponding descriptions in the corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

It may be clearly understood by a person skilled in the art that, for the purpose of convenient and brief description, reference may be made to the corresponding description in the foregoing apparatus embodiments for detailed working procedures of the foregoing devices and modules, and details are not described herein again.

Although the invention is described herein in the general context of program modules that execute in conjunction with an application program that runs on an operating system on a computer system, a person skilled in the art will recognize that the invention may also be implemented in combination with other types of program modules. Generally, program modules comprise routines, programs, components, data structures, and other types of structures that execute particular tasks or implement particular abstract data types. It can be understood by a person skilled in the art that the invention described herein may be practiced with other computer system configurations, comprising handheld devices, multiprocessor systems, microprocessor-based or programmable consumer electronics, minicomputers, mainframe computers, and so on, and may also be practiced in distributed computing environments where tasks are performed by remote processing devices linked through a communications network. In a distributed computing environment, program modules may be located in both local and remote memory storage devices. It can be appreciated by a person of ordinary in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), an erasable programmable read-only memory (EPROM), an electrically erasable programmable read-only memory (EEPROM), a flash memory or other solid-state memory technology, a CD-ROM, a digital versatile disc (DVD), an HD-DVD, a Blue-ray disc or other optical storage devices, a magnetic tape, magnetic disk storage or other magnetic storage devices, or any other medium that can be used for storing required information and can be accessed by a computer.

The foregoing implementation manners are only used to describe the present application, but not to limit the present application. A person of ordinary skill in the art can still make various alterations and modifications without departing from the spirit and scope of the present invention; therefore, all equivalent technical solutions also fall within the scope of the present invention, and the patent protection scope of the present invention should be subject to the claims.

What is claimed is:

1. A switching method, wherein the method comprises:
   determining voice service quality of at least one position in a movement path of at least one user equipment (UE);
   determining a position of the at least one UE; and
   triggering, during a voice communication, in response to that the voice service quality of the at least one position meets a preset condition, and before the at least one UE arrives from the position of the at least one UE to the at least one position corresponding to the voice service quality that meets the preset condition, the at least one UE to switch from a first voice communication mode to a second voice communication mode:
   wherein the determining voice service quality comprises:
       determining the movement path of the at least one UE according to information associated with the movement path of the at least one UE; and
       determining the voice service quality according to at least one voice service quality indicator of the at least one position in the movement path.

2. The method of claim 1, wherein the information associated with the movement path of the at least one UE comprises: historical movement information of the at least one UE.

3. The method of claim 1, wherein the voice service quality indicator of the at least one position comprises at least one of the following: a call completion rate of the at least one position, a call drop rate the at least one position, perceptual evaluation of speech quality (PESQ) of the at least one position, and frequency of switching of a voice communication mode in a range at which multiple positions of the at least one position are located.

4. The method of claim 1, wherein the determining a position of the at least one UE comprises:
   acquiring information associated with the position of the at least one UE; and
   determining the position at least according to the information associated with the position of the at least one UE.

5. The method of claim 4, wherein the acquiring information associated with the position of the at least one UE comprises:
   acquiring, by using an application on the at least one UE, the information associated with the position of the at least one UE.

6. The method of claim 4, wherein the information associated with the position of the at least one UE comprises at least one of the following: Global Positioning System (GPS) information, information sensed by at least one motion sensor, and information sensed by at least one magnetic field sensor.

7. The method of claim 1, wherein the triggering the at least one UE to switch from a first voice communication mode to a second voice communication mode comprises:
   triggering the at least one UE to send, before arriving at the position corresponding to the voice service quality that meets the preset condition, a measurement report to an access network side of the at least one UE, wherein
   the measurement report is used to indicate that voice service quality of the at least one UE meets a condition for switching from the first voice communication mode to the second voice communication mode.

8. The method of claim 1, wherein the triggering the at least one UE to switch from a first voice communication mode to a second voice communication mode comprises:
   establishing a voice communication link of the second voice communication mode for the at least one UE; and
   disconnecting a voice communication link of the first voice communication mode of the at least one UE in response to the establishment of the voice communication link of the second voice communication mode.

9. The method of claim 1, wherein the method further comprises:
   sending a control command associated with the triggering.

10. The method of claim 1, wherein the first voice communication mode comprises IP multimedia subsystem (IMS) based voice communication; and the second voice communication mode comprises circuit switched (CS) domain voice communication.

11. A switching method, wherein the method comprises:
   sending information associated with a position of a user equipment (UE);
   implementing switching of the UE from a first voice communication mode to a second voice communication mode during a voice communication in response to reception of a control command from at least one application server, wherein
   the control command is sent by the at least one application server in response to that voice service quality of at least one position in a movement path of the UE meets a preset condition and before the UE arrives from the position of the UE to the at least one position corresponding to the voice service quality that meets the preset condition; and
   determining the voice service quality, comprising:
      determining the movement path of the at least one UE according to information associated with the movement path of the at least one UE; and
      determining the voice service quality according to at least one voice service quality indicator of the at least one position in the movement path.

12. The method of claim 11, wherein the sending information associated with a position of a UE comprises:
   sending the associated information by using at least one application on the UE.

13. The method of claim 11, wherein the information associated with the position of the UE comprises at least one of the following: Global Positioning System (GPS) information, information sensed by at least one motion sensor, and information sensed by at least one magnetic field sensor.

14. The method of claim 11, further comprising:
   sending the information associated with the movement path of the UE.

15. The method of claim 11, wherein the information associated with the movement path of the UE comprises: historical movement information of the UE.

16. The method of claim 11, wherein the implementing switching of the UE from a first voice communication mode to a second voice communication mode comprises:
   sending a measurement report to an access network side of the UE before the UE arrives at the at least one position corresponding to the voice service quality that meets the preset condition, wherein
   the measurement report is used to indicate that voice service quality of the UE meets a condition for switching from the first voice communication mode to the second voice communication mode.

17. The method of claim 11, wherein the implementing switching of the UE from a first voice communication mode to a second voice communication mode comprises:
   establishing a voice communication link of the second voice communication mode for the UE; and
   disconnecting a voice communication link of the first voice communication mode of the UE in response to the establishment of the voice communication link of the second voice communication mode.

18. The method of claim 11, wherein the first voice communication mode comprises IP multimedia subsystem (IMS) based voice communication; and the second voice communication mode comprises circuit switched (CS) domain voice communication.

19. A switching apparatus, wherein the apparatus comprises:
   a transceiver;
   a memory, configured to store an instruction; and
   a processor, configured to execute the instruction stored in the memory, wherein the instruction enables the processor to execute the following steps:
   determining voice service quality of at least one position in a movement path of at least one user equipment (UE);
   determining a position of the at least one UE; and
   triggering, during a voice communication, in response to that the voice service quality of the at least one position meets a preset condition, and before the at least one UE arrives from the position of the at least one UE to the at least one position corresponding to the voice service quality that meets the preset condition, the at least one UE to switch from a first voice communication mode to a second voice communication mode;
   wherein the determining voice service quality comprises:
      determining the movement path of the at least one UE according to information associated with the movement path of the at least one UE; and
      determining the voice service quality according to at least one voice service quality indicator of the at least one position in the movement path.

20. A switching apparatus, wherein the apparatus comprises:
   a transceiver;
   a memory, configured to store an instruction; and
   a processor, configured to execute the instruction stored in the memory, wherein the instruction enables the processor to execute the following steps:
   sending, by using the transceiver, information associated with a position of a user equipment (UE);
   implementing switching of the UE from a first voice communication mode to a second voice communication mode during a voice communication in response to reception of a control command from at least one application server, wherein
   the control command is sent by the at least one application server in response to that voice service quality of at least one position in a movement path of the UE meets a preset condition and before the UE arrives from the position of the UE to the at least one position corresponding to the voice service quality that meets the preset condition; and
   determining voice service quality, comprising:
      determining the movement path of the at least one UE according to information associated with the movement path of the at least one UE; and determining the voice service quality according to at least one voice service quality indicator of the at least one position in the movement path.

21. The apparatus of claim 19, wherein the determining a position of the at least one UE comprises:
   acquiring information associated with the position of the at least one UE; and
   determining the position according to the information associated with the position of the at least one UE.

22. The apparatus of claim 21, wherein the acquiring information associated with the position of the at least one UE comprises acquiring the information associated with the position of the at least one UE by using an application on the at least one UE.

23. The apparatus of claim 19, wherein the triggering the at least one UE to switch from a first voice communication mode to a second voice communication mode comprises:
   triggering the at least one UE to send, before arriving at the position corresponding to the voice service quality that meets the preset condition, a measurement report to an access network side of the at least one UE, wherein the measurement report is used to indicate that voice service quality of the at least one UE meets a condition for switching from the first voice communication mode to the second voice communication mode.

24. The apparatus of claim 19, wherein the triggering the at least one UE to switch from a first voice communication mode to a second voice communication mode comprises:
   establishing a voice communication link of the second voice communication mode for the at least one UE; and
   disconnecting a voice communication link of the first voice communication mode of the at least one UE in response to the establishment of the voice communication link of the second voice communication mode.

25. The apparatus of claim 19, wherein the steps for the processor to execute further comprises:
   sending a control command associated with the triggering.

26. The apparatus of claim 20, wherein the sending information associated with a position of a UE comprises:
   sending the associated information by using at least one application on the UE.

27. The apparatus of claim 20, wherein the steps for the processor to execute further comprises:
   sending the information associated with the movement path of the UE.

28. The apparatus of claim 20, wherein the implementing switching of the UE from a first voice communication mode to a second voice communication mode comprises:
   sending a measurement report to an access network side of the UE before the UE arrives at the at least one position corresponding to the voice service quality that meets the preset condition, wherein the measurement report is used to indicate that voice service quality of the UE meets a condition for switching from the first voice communication mode to the second voice communication mode.

29. The apparatus of claim 20, wherein the implementing switching of the UE from a first voice communication mode to a second voice communication mode comprises:
   establishing a voice communication link of the second voice communication mode for the UE; and
   disconnecting a voice communication link of the first voice communication mode of the UE in response to the establishment of the voice communication link of the second voice communication mode.

* * * * *